April 3, 1962 G. HOHWART 3,028,159
AIR OPERATED PUMP JIG
Filed Dec. 21, 1959 2 Sheets-Sheet 1
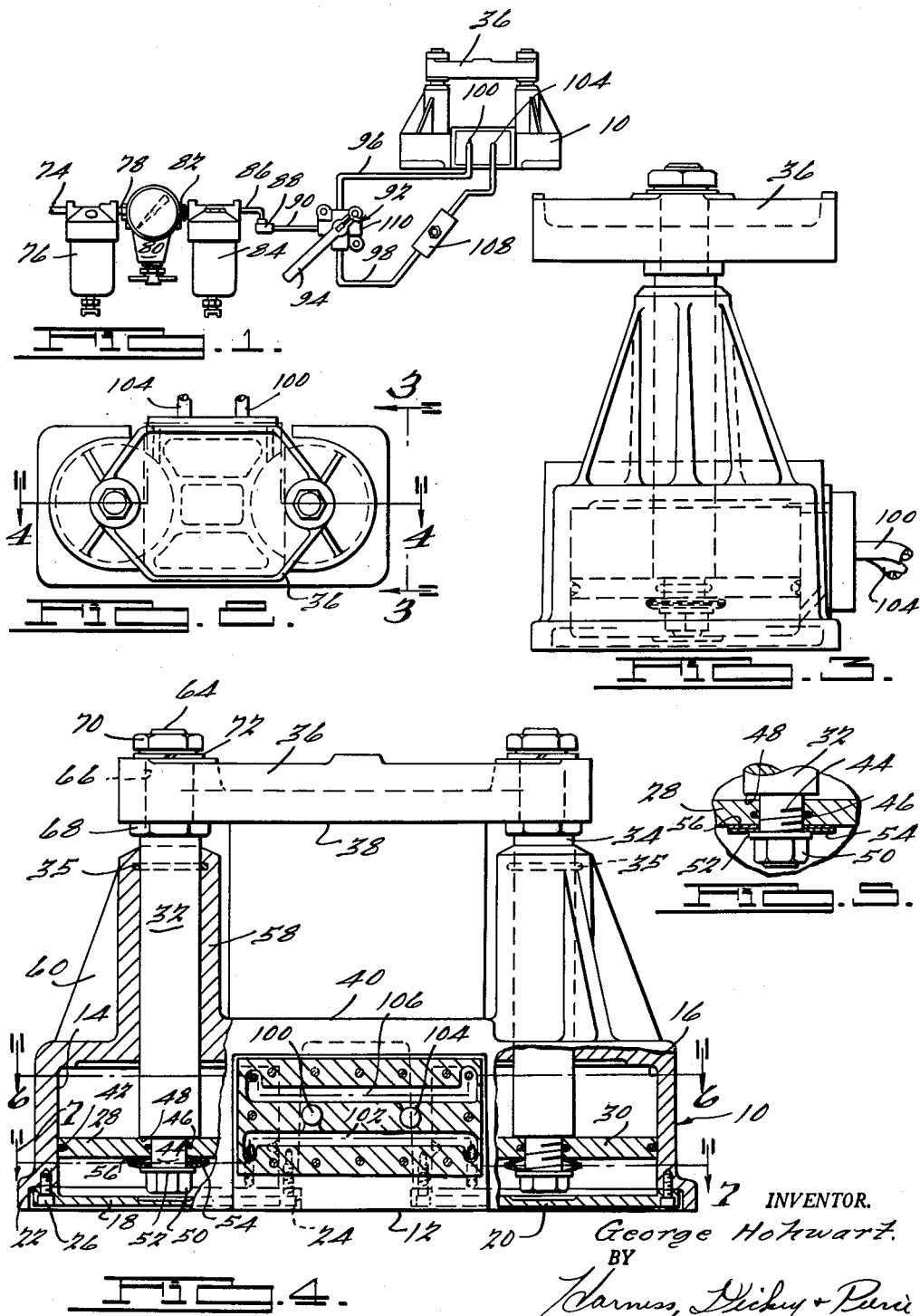
INVENTOR.
George Hohwart
BY
Harness, Dickey & Pierce
ATTORNEYS April 3, 1962 G. HOHWART 3,028,159
AIR OPERATED PUMP JIG
Filed Dec. 21, 1959 2 Sheets-Sheet 2
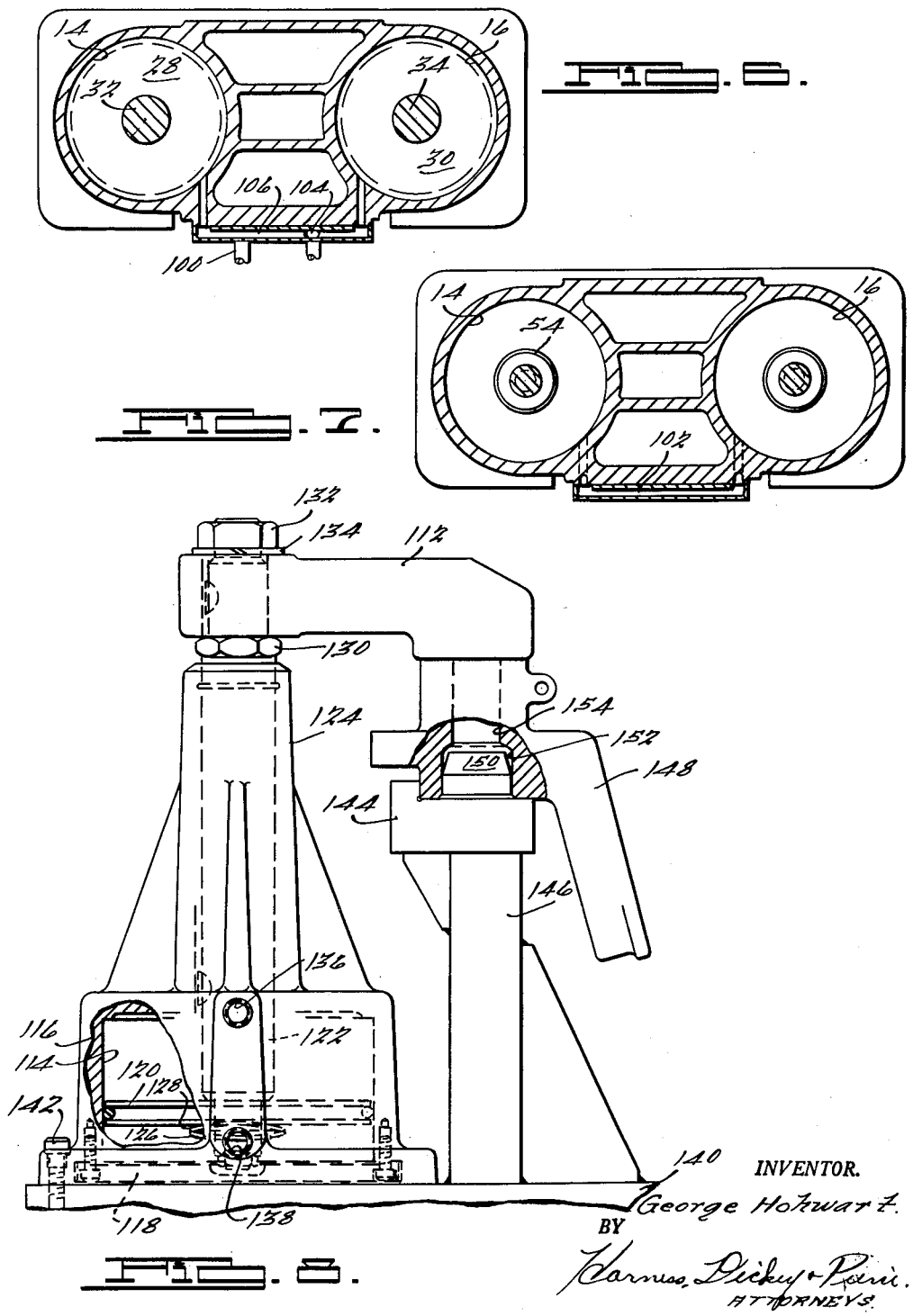
INVENTOR.
George Hohwart.
BY
Barnes, Dickey & Pierce.
ATTORNEYS United States Patent Office 3,028,159
Patented Apr. 3, 1962

3,028,159
AIR OPERATED PUMP JIG
George Hohwart, Farmington, Mich., assignor to N. A. Woodworth Company, Ferndale, Mich., a corporation of Michigan
Filed Dec. 21, 1959, Ser. No. 860,748
5 Claims. (Cl. 269—137)

This invention relates to new and useful improvements in work clamping fixtures.

The invention is here shown embodied in a work clamping fixture of the type conventionally referred to as a pump jig. In this type of fixture, a workpiece is held securely on a suitable stationary jaw or base by a movable clamping jaw while a machining operation or the like is performed thereon. The work clamping jaw can be moved into or out of work clamping position either by manual means or by power operated means. In a power operated jig, the clamping jaw is connected to and actuated by one or more fluid motors, and the latter preferably are adapted for operation by air pressure with which machine shops conventionally are provided.

An important object of the present invention is to provide a power operated jig of the above mentioned character that is uniquely constructed to fail safe in the event the air supply in the shop should fail.

Another object of the invention is to provide a work clamping fixture of the above mentioned character that is uniquely constructed to maintain clamping pressure on the work for at least a limited period of time after a failure of the air supply even though a slow loss of pressure in the fixture occurs due to wear of parts or for other reasons.

Other objects and advantages of the invention will be apparent during the course of the following description:

In the drawing forming a part of this specification and wherein like numerals are employed to designate like parts throughout the same:

FIGURE 1 is a diagrammatic view of a work clamping fixture embodying the invention and operating and control mechanism therefor;

FIG. 2 is a top plan view of the same;

FIG. 3 is an enlarged side elevational view looking in the direction of the arrows 3—3 in FIG. 2;

FIG. 4 is an enlarged vertical sectional view taken on the line 4—4 of FIG. 2 particularly illustrating the cylinder and piston assemblies that actuate the clamping jaw of the fixture, said pistons being shown in partially clamped position;

FIG. 5 is a fragmentary sectional view showing one of the clamp actuating pistons in the fully clamped position;

FIG. 6 is a transverse sectional view taken on the line 6—6 of FIG. 4;

FIG. 7 is a transverse sectional view taken on the line 7—7 of FIG. 4; and

FIG. 8 is a side elevational view of a modified clamping fixture embodying the invention.

As suggested, this invention is concerned in the broad sense with a clamping device. It is primarily adapted and preeminently suited for use as a work clamping fixture and is here shown by way of illustration embodied in a work clamping fixture of the type generally referred to as a pump jig. Pump jigs are conventionally used to hold a workpiece while a machine operation or the like is performed thereon.

The clamping device of this invention broadly comprises a clamping jaw movable against a workpiece to hold the latter securely on a stationary jaw or base which may or may not be a part of the fixture, per se by one or more fluid motors which preferably are adapted for operation by compressed air at a pressure conventionally found in machine shops. Each such fluid motor comprises a piston reciprocable in a cylinder and a piston rod carried by the piston extending from the cylinder and connected to the movable jaw. Air under pressure is supplied to the cylinder at opposite sides of the piston to advance or retract the latter so as to move the jaw into and out of clamping engagement with the workpiece. It is a feature of the invention that the piston is mounted for limited sliding movement on the piston rod and that spring means are confined between the piston and a spring seat formed on the piston rod which hold the piston at one limit of its travel on the piston rod and resist movement of the piston on the piston rod in a direction to clamp the movable jaw on the workpiece. Any type of spring can be used but a constant rate spring such as a "Schnoor" washer preferably is used.

By reason of the above construction, air under pressure introduced into the cylinder behind the piston advances the piston and piston rod to move the jaw into clamping engagement with the work. The spring means, of course, resists relative movement between the piston and the piston rod during initial movement of the clamping jaw and until the latter actually engages the work. Thus, the piston rod moves as a unit during this portion of the clamping operation. However, the spring means is adapted to collapse at a pressure less than the full pressure exerted by the piston so that the piston moves on the piston rod to flatten or collapse the spring means after the clamping jaw engages the work, and at that point full clamping pressure is exerted on the work through the clamping jaw. Conversely, when air under pressure is introduced into the cylinder ahead of the piston, the spring means immediately returns the piston to its original position on the piston rod and the piston and piston rod are retracted as a unit to unclamp the work and to lift the clamping jaw free from the work.

It is important, of course, that the fixture hold the work securely clamped at all times while a machining or other operation is performed thereon and under all conditions including a failure of pressure in the air supply line that services the clamping fixture. The instant device is uniquely constructed to hold the work even though the shop air supply fails. To this end a suitable valve such as a check valve or the like is provided in the fluid supply line to admit air under pressure into the cylinder behind the piston and to close in the event of a loss of pressure in the line behind the valve. Thus, if the shop air supply should fail, there are two safety features that keep the fixture locked. First, the check valve closes and prevents air from escaping back into the defective shop supply line. Secondly, any minor leak in the fixture or in the line between the valve and the fixture is compensated for a long enough time to assure completion of the work operation by movement of the piston on the piston rod under the action of the spring means.

For a detailed description of the invention, reference is first had to FIGS. 1–7 which show a bridge-type pump jig comprising a base casting 10 having a flat bottom surface 12 and laterally spaced, vertical cylinders 14 and 16 at opposite sides thereof. The two cylinders 14 and 16 open through the bottom 12 and are normally closed by plates 18 and 20 which preferably are recessed above or behind the surface 12 so as not to interfere with mounting or placement of the fixture. This construction is best illustrated in FIG. 4 wherein the cylinder 14 is shown in vertical section. It will be observed that the plate 18 has a relatively thick, strong rim portion 22 which fits into an annular recess 24 at the bottom of the cylinder 14 and that screws 26 extend upwardly through the rim portion of the plate into the base casting 10 to hold the plate attached securely to the casting. The plate 20 is similarly received by the cylinder 16 and it is similarly fastened to the base casting 10.

The pistons 28 and 30 are mounted for reciprocation in respective cylinders 14 and 16 and the piston rods 32 and 34 carried by the pistons extend upwardly from the casting 10. O-rings 35 provide pressure seals between the piston rods 32 and 34 and the casting 10. A movable clamping jaw 36 mounted on and extending between the projecting upper ends of the piston rods 32 and 34 is adapted to clamp a workpiece between the flat under surface 38 of the jaw and the opposed flat surface 40 on the casting 10. In this connection, it will be readily appreciated that the clamping fixture of this invention can be adapted for special sizes or shapes of workpieces and that the clamping surfaces 38 and 40 can be given any form necessary to adapt them to a workpiece. When the pistons 28 and 30 are advanced in the cylinders 14 and 16, they lower the jaw 36 and clamp the workpiece. Conversely, when the pistons 28 and 30 are retracted in the cylinders 14 and 16, they raise the jaw 36 and unclamp the workpiece.

The two piston and piston rod assemblies are identical and a detailed description of one therefore will suffice. The piston assembly in the cylinder 14 is shown in detail in FIG. 4 and this piston therefore is selected for description. As shown, the piston 28 fits snugly but slidably in the cylinder 14, and an O-ring 42 recessed into the periphery of the piston seals the space between the latter and the cylinder. The piston rod 32 is formed at the lower end thereof with a terminal portion or stud 44 of reduced diameter which extends centrally through the piston 28. An O-ring 46 recessed into the piston seals the latter against the terminal portion of stud 44 but the piston is free to slide for a limited distance on the stud. A radial shoulder 48 defined on the piston rod 32 by the stud 44 seats on the piston 28 as shown in FIG. 4 to limit upward or retractive movement of the piston on the piston rod. A nut 50 and washer 52 are provided on the stud 44 below and spaced from the piston 28, and spring elements in the form of "Schnoor" washers 54 and 56 interposed between the piston 28 and the washer 52 hold the piston normally against the shoulder 48.

The piston rod 32 extends upwardly through a vertically elongated embossment 58 on the base casting 10, and the embossment provides a relatively long sliding bearing for the rod. If necessary or desirable, the embossment 58 can be suitably reinforced by lateral ribs 60 formed on the base casting 10 and integrally therewith. As shown, the piston rod 32 extends upwardly from the embossment 58 and an externally threaded terminal portion or stud 64 formed thereon extends through an opening 66 in and at the end of the jaw 36. Nuts 68 and 70 on the stud 64 at opposite sides of the jaw 36 hold the latter attached securely to the piston rod 32. A lock washer 72 preferably is provided under the nut 70.

The clamping device or jig here shown is air operated and air under pressure is delivered from any suitable source through an air supply pipe 74. As shown in FIG. 1, the pipe 74 delivers air first to a filter 76 which removes dirt particles and other undesirable foreign matter from the air stream. From the filter 76 air flows through a connecting pipe 78 to a pressure regulator 80 which maintains air delivered to the jig at a relatively constant pressure. Thence, air flows through a coupling 82 to an oiler 84 where a suitable lubricant is added to the air stream to lubricate the working parts of the jig. Air discharged from the oiler 84 flows through a pipe 86 to a check valve 88 which opens in the direction of the jig and thence through a pipe 90 to a four-way operating valve 92. The latter is equipped with the usual operating handle 94 that can be manipulated to deliver air to either of two branch pipes 96 and 98. The branch pipe 96 is connected to an inlet 100 in the base casting 10 which leads to a manifold 102 communicating at its ends with the cylinders 14 and 16 below or in front of the pistons 28 and 30. The branch pipe 98 is connected to an inlet 104 in the base casting 10 which opens into a manifold 106 communicating at its ends with the cylinders 14 and 16 above or behind the pistons 28 and 30.

The four-way valve 92 has an exhaust opening 110 that is connected automatically to the low pressure sides of the pistons 28 and 30 in either position of the operating handle 94. All of the devices 76, 80, 84, 88, 92 and 108 are conventional and well-known in the art so that a complete description thereof is not necessary. When valve 92 is positioned to direct air to the branch pipe 96, pressure builds up in the cylinders 14 and 16 in front of the pistons 28 and 30 to retract the latter and to open the clamping jaw 36. Conversely, when valve 92 is set to deliver air to the branch pipe 98, pressure builds up in the cylinders 14 and 16 behind the pistons 28 and 30 to advance the latter and to close the clamping jaw 36. A speed control valve 108 in the branch pipe 98 controls the rate of flow of air through the pipe and thus regulates the rate of travel of the jaw 36 as it moves to engage the work. The valve 108 preferably is adjustable so that the operator can control the rate at which the jaw 36 closes. The check valve 88 is adapted to close in the event of a failure in the air supply pipe 74 so as to hold air pressure in the cylinders 14 and 16 and to hold the clamping jaw 36 tightly against the work.

In a typical operation, the shop air line 74 may carry a pressure of 80 pounds per square inch, and in a typical situation the pressure regulator may be adjusted to deliver air to the power cylinders 14 and 16 at a pressure of 70 pounds per square inch. Under these conditions, the workpiece is clamped at a pressure equal to the sum of the effective areas of the two pistons 28 and 30 multiplied by seventy pounds per square inch. Air delivered to the cylinders 14 and 16 behind the pistons 28 and 30 advances the latter to clamp the jaw 36 against the workpiece. During the travel of the pistons 28 and 30 prior to engagement of the clamping jaw 36 with the work, the pistons are held in retracted positions on the piston rods 32 and 34 by the dished washers 54 and 56, as shown in FIG. 4. However, as soon as the clamping jaw 36 engages the work, pressure exerted on the pistons 28 and 30 causes them to advance on the piston rods 32 and 34 to flatten the washers 54 and 56, as shown in FIG. 5. The spring washers 54 and 56 are caused to collapse at a pressure less than the total pressure exerted by the pistons 28 and 30; and, in the typical situation described, the spring washers may be adapted to collapse at sixty pounds per square inch. Spring washers 54 and 56 of the type here shown collapse at a substantially uniform rate and they deliver a substantially constant counter pressure against the pistons 28 and 30 at all times between the fully collapsed and fully extended positions shown in FIGS. 5 and 4, respectively.

Any number of spring washers can be used depending upon the desired travel of the pistons 28 and 30 on the piston rods 32 and 34. Two such washers are here shown, and in a typical situation these washers may permit the pistons 28 and 30 to travel approximately three-sixteenths of an inch on the piston rods 32 and 34. When the valve 92 is reversed to deliver air under pressure to the cylinders 14 and 16 ahead of the pistons 28 and 30, the spring washers 54 and 56 simply expand and retract pistons 28 and 30 on the piston rods 32 and 34. However, if the shop air supply should fail for any reason, two safety features keep the clamping jaw 36 locked securely against the work. First, the check valve 88 closes and prevents air from escaping back into the shop air supply line 74. Further, even assuming that minor leaks have developed in the clamping apparatus due to wear of parts or other causes the flattened spring washers 54 and 56 follow up the reduced air pressure in the cylinders 14 and 16 behind the pistons 28 and 30 and maintain a sixty pounds per square inch pressure for a considerable length of time. In any normal situation, the spring washers 54 and 56 maintain the sixty pounds per square inch pressure long enough to complete safely the operation on the workpiece. Under these conditions, there is little if any chance of the workpiece being thrown out of the clamping fixture by the work operation due to a failure of air pressure to the clamp.

Reference is now had to FIG. 8 which shows a modified clamping fixture having a clamping arm 112 operated by a single cylinder 114. As shown, the cylinder 114 is provided in a suitable base casting 116. The cylinder 114 opens downwardly through the base of the casting and is normally closed by a closure plate 118, as in the form of the invention first described. A piston 120 is mounted for reciprocation in the cylinder 114, and a piston rod 122 extending downwardly into the cylinder 114 through an elongated embossment 124 on the base casting 116 is connected to the piston 120. Also, the piston 120 has a limited sliding movement on the piston rod 122 and is normally held at the upper limit of its travel on the piston rod by dished washers 126 and 128. The clamping arm is similarly fastened on the upper end of the piston rod 122 by nuts 130 and 132 and lock washer 134.

Air passes to and from the cylinder 114 behind the piston 120 through an opening 136 in the base casting 116, and air passes to and from the cylinder ahead of the piston through an opening 138. In this form of the invention the opening 136 corresponds to the inlet 104 in the first form of the invention and the opening 138 corresponds to the inlet 100. Air under pressure is delivered to the cylinder 114 in the same manner as in the first form of the invention, and the air is similarly controlled, regulated and treated prior to delivery.

In this form of the invention the casting 116 is mounted on and fastened to a base plate 140 by screws 142, and a stationary jaw 144 is supported on the base plate by a suitable standard 146 below the clamping end of the movable jaw 112. The clamp here shown is adapted to receive a workpiece 148 and the stationary jaw 144 is formed with a locating stud 150 adapted to be piloted in the countersink 152 of a hole 154 in the work.

The workpiece 148 is clamped by the jaws 112 and 114, as shown in FIG. 8, and the clamping fixture operates in the same manner to achieve the same beneficial results as the form of the invention first described.

What is claimed is:

1. A clamping fixture comprising a clamping jaw, a fluid motor operatively connected to said jaw to move the same into and out of clamping position, said fluid motor including a cylinder, a piston rod having a portion thereof extending into said cylinder, a spring seat on said piston rod within said cylinder, a piston carried by said piston rod mounted for reciprocation in said cylinder and having limited axial movement on the piston rod relative to said spring seat, spring means interposed between said spring seat and said piston acting thereon to hold the same normally away from said spring seat, means for introducing fluid under pressure into said cylinder at the side of said piston opposite said spring means for moving said piston in a direction to bring said jaw into clamping position at a predetermined clamping pressure, and means for holding fluid under pressure in said cylinder, said spring means adapted to be collapsed by said piston at a pressure less than the full clamping pressure exerted by the latter and being operative to move said piston on said piston rod in a direction to maintain the full pressure exerted by said spring means on said clamping jaw to hold the latter in clamping position in the event of loss of fluid pressure in said cylinder.

2. A work clamping fixture comprising a cylinder, a reciprocable piston rod extending into said cylinder, a spring seat on said piston rod within said cylinder, a piston in said cylinder slidable on said piston rod relative to said spring seat, spring means confined between said spring seat and said piston, means for introducing fluid under pressure into said cylinder at the side thereof opposite said spring means operative to move said piston on said rod to collapse said spring means and also to move said piston and said rod jointly in said cylinder, and means for holding fluid under pressure in said cylinder, and a clamping jaw carried by said piston rod exteriorly of said cylinder movable into said clamping position by fluid pressure in said cylinder, said spring means adapted to collapse at a pressure less than the full fluid pressure created in said cylinder and exerting a counter pressure on said piston tending to move the latter on said piston rod against said fluid pressure, said spring means when collapsed being rendered operative by a predetermined reduction in said fluid pressure to move said piston on said rod in a direction to maintain a reduced fluid pressure in the cylinder for at least the limit of travel of said piston on said piston rod.

3. A work clamping fixture comprising a cylinder, a reciprocable piston rod extending into said cylinder, a spring seat on said piston rod within said cylinder, a piston in said cylinder slidable on said piston rod relative to said spring seat, spring means confined between said spring seat and said piston, a fluid supply line for introducing fluid under pressure into the cylinder at the side of the piston opposite said spring means, a check valve in said fluid supply line for holding fluid pressure in said cylinder, and a clamping jaw carried by said piston rod exteriorly of said cylinder movable into clamping position by fluid pressure in the cylinder, said piston being movable on said piston rod to collapse said spring means by fluid pressure in the cylinder, said spring means exerting a counter pressure on said piston and operative to move said piston on said piston rod to compensate for a loss of fluid pressure between said check valve and said piston to maintain the full pressure of said spring means on said clamping jaw for at least the limit of travel of said piston on said piston rod under the action of said spring means.

4. A work clamping fixture comprising a pair of laterally spaced cylinders, piston rods extending axially into said cylinders, spring seats on said piston rods within said cylinders, pistons in said cylinders slidable on respective piston rods relative to said spring seats, spring means confined between said spring seats and said pistons, a work clamping jaw connected to said piston rods exteriorly of said cylinders, a fluid supply line for supplying fluid under pressure simultaneously to said cylinders at the sides of said pistons opposite said spring means operative to advance said pistons in said cylinders to move said jaw into clamping position and also operative to move said pistons on said piston rods to collapse said spring means, and valve means controlling said fluid supply line adapted in part at least to hold fluid under pressure in said cylinder, said spring means when collapsed exerting a counter pressure on said pistons tending to move the latter on said piston rods against fluid pressure in said cylinders and rendered operative by reduction in said fluid pressure to move said pistons on said piston rods to maintain the full pressure of said spring means on fluid in the cylinders and to compensate for loss of fluid pressure in the system.

5. A work clamping fixture comprising a pair of laterally spaced cylinders, piston rods extending axially into said cylinders, spring seats on said piston rods within said cylinders, pistons in said cylinders slidable on said piston rods above said spring seats, springs below said pistons confined between the latter and said spring seats, a work clamping jaw carried by and bridging said piston rods exteriorly of said cylinders, a fluid pressure supply line for introducing air under pressure simultaneously into said cylinders above said pistons, valve means controlling said fluid pressure supply line and adapted in part at least to hold fluid under pressure in said cylinder, air pressure in said cylinders above said pistons being operative to advance said pistons and said piston rods jointly in said cylinders to move said jaw into work clamping position and also to advance said pistons on said piston rods against said spring means, said spring means operative to retract said pistons on said piston rods in the event of a predetermined reduction of pressure in the cylinders above said pistons and being operative by such retractive movement of said pistons to maintain the full pressure of said spring means on said fluid and on said clamping jaw for at least the limit of retractive travel of said pistons or said piston rods.

References Cited in the file of this patent

UNITED STATES PATENTS

| | | |
|---|---|---|
| 2,081,040 | King | May 18, 1937 |
| 2,238,434 | Oberhoffkin | Apr. 15, 1941 |
| 2,323,770 | Hazelton | July 6, 1943 |
| 2,663,339 | Verderber | Dec. 22, 1953 |